(12) United States Patent
Biasiotto et al.

(10) Patent No.: US 7,409,985 B2
(45) Date of Patent: Aug. 12, 2008

(54) MOTOR VEHICLE AIR CONDITIONING SYSTEM WITH AIR DISTRIBUTOR AND MIXER DEVICE, WITH COANDA EFFECT, HAVING OUTLETS AT DIFFERENTIATED TEMPERATURES

(75) Inventors: Marco Biasiotto, Orbassano (IT); Andrea Perosino, Orbassano (IT); Francesco Butera, Orbassano (IT)

(73) Assignee: CRF Societa Consortile per Azioni, Orbassano (Torino) (IT)

( * ) Notice: Subject to any disclaimer, the term of this patent is extended or adjusted under 35 U.S.C. 154(b) by 574 days.

(21) Appl. No.: 10/518,712

(22) PCT Filed: Dec. 23, 2003

(86) PCT No.: PCT/IB03/06259

§ 371 (c)(1), (2), (4) Date: Dec. 22, 2004

(87) PCT Pub. No.: WO2004/065149

PCT Pub. Date: Aug. 5, 2004

(65) Prior Publication Data

US 2005/0247445 A1    Nov. 10, 2005

(30) Foreign Application Priority Data

Jan. 24, 2003    (IT)  .......................... TO2003A0036

(51) Int. Cl.
*B60H 1/00* (2006.01)
(52) U.S. Cl. ...................................................... 165/204
(58) Field of Classification Search .................... 165/41, 165/42, 43, 44, 202, 204, 207, 216; 454/99, 454/121, 155, 230, 232, 233, 245, 249, 251, 454/252, 261, 69, 139, 143
See application file for complete search history.

(56) References Cited

U.S. PATENT DOCUMENTS

| 3,429,367 | A | * | 2/1969 | McGrath | 165/207 |
| 4,227,569 | A | * | 10/1980 | Wattin | 165/202 |
| 4,285,647 | A | * | 8/1981 | Dunkerly, II | 425/82.1 |
| 4,354,547 | A | * | 10/1982 | Sugiura | 165/263 |
| 4,413,935 | A | * | 11/1983 | Smith et al. | 406/181 |

(Continued)

FOREIGN PATENT DOCUMENTS

EP    1 382 472 A    1/2004

(Continued)

*Primary Examiner*—Cheryl J. Tyler
*Assistant Examiner*—Joseph Corrigan
(74) *Attorney, Agent, or Firm*—Sughrue Mion, PLLC

(57) ABSTRACT

A motor vehicle air conditioning system including a Coanda effect air distributor device and mixing means which allow to vary the temperature of the air available to the different outlet conduits of the distributor device for the same setting of the means for regulating the temperature of the system. In this way, for a same setting of the temperature regulating means, the air conveyed to the outlets situated at the base of the windshield is at a higher temperature than the air conveyed to the other outlets and in particular to those adjacent to the floor of the motor vehicle passenger compartment. Preferably, a third, still lower temperature level is available to the outlets situated in the front part of the dashboard of the motor vehicle in the direction of the motor vehicle occupants.

12 Claims, 5 Drawing Sheets

U.S. PATENT DOCUMENTS

| | | | |
|---|---|---|---|
| 4,478,274 A * | 10/1984 | Naganoma et al. | 165/204 |
| 4,586,652 A * | 5/1986 | Sakurai | 236/13 |
| 4,852,363 A * | 8/1989 | Kampf et al. | 62/176.6 |
| 4,895,000 A * | 1/1990 | Takahashi | 62/176.3 |
| 4,899,809 A * | 2/1990 | Takenaka et al. | 165/202 |
| 4,938,033 A * | 7/1990 | Ogihara et al. | 62/186 |
| 4,940,083 A * | 7/1990 | Takenaka et al. | 165/42 |
| 5,051,884 A * | 9/1991 | Iida | 701/36 |
| 5,259,815 A * | 11/1993 | Stouffer et al. | 454/125 |
| 6,036,594 A * | 3/2000 | Kwon et al. | 454/156 |
| 6,213,867 B1 * | 4/2001 | Yazici et al. | 454/263 |
| 6,304,803 B1 * | 10/2001 | Dao | 701/36 |
| 6,419,006 B1 * | 7/2002 | Loup et al. | 165/42 |
| 6,595,276 B2 * | 7/2003 | Bendell et al. | 165/202 |
| 6,598,671 B1 * | 7/2003 | Zeng et al. | 165/240 |
| 6,662,864 B2 * | 12/2003 | Burk et al. | 165/202 |

FOREIGN PATENT DOCUMENTS

| | | |
|---|---|---|
| WO | WO 02/072371 A | 9/2002 |
| WO | WO 03/002362 A | 1/2003 |

* cited by examiner

MOTOR VEHICLE AIR CONDITIONING SYSTEM WITH AIR DISTRIBUTOR AND MIXER DEVICE, WITH COANDA EFFECT, HAVING OUTLETS AT DIFFERENTIATED TEMPERATURES

BACKGROUND OF THE INVENTION

The present invention relates to a motor vehicle air conditioning system comprising an air distributor device including a structure defining a main conduit and a plurality of outlet conduits communicated to the main conduit and to be connected to a plurality of outlets for delivering air into the passenger compartment of a motor vehicle, and distributor means exploiting the Coanda effect, which are mounted in the structure of the distributor device and movable in a plurality of operative positions, each causing deviation by the Coanda effect of the flow of air from the main conduit into a selected outlet conduit.

An air distributor device exploiting the Coanda effect, of the type indicated above, was disclosed in prior Italian Patent Application no. TO2001A000223, filed on 12 Mar. 2001 by the same Applicant, as well in corresponding International (PCT) Patent Application WO02072371. In a typical case, the main conduit branches off into three outlet conduits which are to be connected to respective air outlets for delivering air into the passenger compartment of the motor vehicle. The outlets are located at the base of the windshield ("defroster" function), as well as on the front part of the dashboard, to direct air towards the driver and the passenger occupying the front seat ("ventilation" function) and also below, adjacent to the floor of the motor vehicle passenger compartment ("heating" function). Also according to a typical configuration, the system comprises a plurality of (typically four) main conduits each branching off into three outlet conduits, to serve outlets situated at the centre of conduits, to serve outlets situated at the centre of the passenger compartment or adjacent to a side of the motor vehicle, respectively for the driver side and for the passenger side.

On the other hand, in air heating and cooling systems for motor vehicles there is the need to obtain that the air exiting the outlets located respectively adjacent to the windshield, on the front side of the dashboard and adjacent to the floor is at a different temperature for a same setting of the air temperature regulating device.

SUMMARY OF THE INVENTION

The object of the present invention is to propose a new air heating and cooling system with an air distributor device exploiting the Coanda effect, having the characteristics already proposed in the Applicant's previous patent application which has been identified above, and which also allows to meet the aforesaid need for a differentiation in temperature of the air flowing out of the different outlet conduits of the distributor device.

In view of achieving this object, the invention relates to an air heating and cooling system for motor vehicles, comprising:

an air distributor device including:
  a structure defining a main conduit and a plurality of outlet conduits communicating with the main conduit and to be connected to a plurality of outlets for delivering air into the passenger compartment of a motor vehicle,
  distributor means exploiting the Coanda effect, mounted in the structure of the distributor device and able to be moved in a plurality of operative positions, each causing the deviation, by the Coanda effect, of the air flowing through the main conduit into a selected outlet conduit,
characterised in that said device further comprises:
  a radiating mass positioned upstream of the main conduit, in such a way as to be traversed by the flow which reaches the main conduit from an inlet conduit of the distributor device, to heat said flow of air,
  a by-pass conduit which directly connects the inlet conduit with the main conduit, in parallel with the portion of conduit in which the radiating mass is positioned,
  means for throttling said by-pass conduit, for variably obstructing said by-pass conduit depending upon the various positions of the aforesaid Coanda effect distributor means which cause deviation of the air flow from the main conduit into a selected outlet conduit,
  so that the temperature of the air flowing out of the distributor device has a different value depending upon which is the selected outlet conduit into which the air from the main conduit is directed.

Therefore, in the device according to the invention, the positioning of the aforesaid Coanda effect distributor means in different operative positions not only causes the deviation of the air flow from the main conduit into a selected one of the outlet conduits, but, in addition thereto, it also causes a different positioning of the means for throttling the by-pass conduit. The air flowing out of the selected outlet conduit will have a temperature that depends on the mixing of the air flow through the main conduit (which for the most part has passed through the heating radiating mass) with the air flow coming from the by pass conduit. Therefore, it is possible, for a same setting of the temperature regulating means of the system, to cause the air flowing out of the distributor device to have different temperatures, depending on whether said air is directed towards the windshield, or frontally against the occupants of the motor vehicle, or below in the direction of the floor.

The most desirable case is that providing less warm air on the outlets positioned frontally on the dashboard of the motor vehicle, a slightly warmer air at the feet and even warmer air on the windshield. In the ideal case, therefore, three different temperature levels are obtained.

Naturally, as indicated, said differentiation in air temperature is achieved for a same setting of the air temperature regulating system. Said regulating system can naturally be constructed in any known fashion.

In a typical case, the air temperature regulating system comprises a pivotable shutter which controls an opening that places the inlet conduit of the air distributor device in direct communication with the aforesaid main conduit, thereby allowing part of the flow of cold air coming from the inlet to pass directly into the main conduit, without flowing through the radiating mass. According to the prior art, the pivotable shutter can be moved between a first operative position, in which it completely obstructs the opening, thus providing a condition of maximum temperature of the air flowing out of the distributor device, and a second operative position, in which the opening is fully open, whilst the passage through the radiating mass is obstructed, so that a minimum temperature condition is provided, with the entire air mass entering into the distributor device which arrives at the main conduit without passing through the radiating mass.

Obviously, if the temperature regulating system exploits an opening of this kind, with the above described pivotable shutter, the by-pass conduit of the system according to the invention, which is controlled by the aforesaid throttling means in synchronism with the Coanda effect distributor means, represents a second by-pass (with a much smaller cross section), in addition to the by-pass constituted by the aforesaid opening controlled by the pivotable shutter of the temperature regulating system.

Also possible is the case in which the temperature regulating system does not have an opening of the type described above, with the associated pivotable shutter, but simply exploits a regulation of the temperature of the radiating mass, obtained by regulating the flow rate of the heating fluid which circulates in the plates of the radiating mass.

Lastly, it is necessary to consider that, although the preferred embodiment of the invention provides for obtaining, for a same setting of the temperature regulating system, three different temperature levels at the three outlet conduits of the distributor device, a simplified solution is also possible, comprising only two different temperature levels, i.e. a higher temperature exploited both for the "defroster" function (windshield), and for the heating function (floor) and a lower temperature for the ventilation function (front outlets of the dashboard).

Naturally, as mentioned above, the distributor device may comprise a plurality of main conduits (preferably four, two for the driver side and two for the passenger side, each pair including a conduit communicating with the outlets at the centre of the dashboard and a conduit communicating with the outlets on the respective side thereof) each main conduit being provided with the Coanda effect distributor means and with a respective by-pass conduit with the aforesaid throttling means associated therewith. It is thus possible, for a same setting of the temperature regulating system, to send air simultaneously to the windshield, to the passengers and to the floor at differentiated temperatures in the manner described above.

Also in the case of the preferred embodiment of the invention, the aforesaid Coanda effect distributing means comprise at least a flow perturbating member having at least two different operative positions to cause the deviation, by Coanda effect, of the air flow which traverses the main conduit at least into a first or into a second outlet conduit. In this case the aforesaid means for throttling the by-pass conduit are constituted by a shutter, mechanically connected to the aforesaid flow perturbating member. Also preferably, the flow perturbating member is a rocker arm member having two operative ends situated in correspondence with two openings formed in a wall of the main conduit, said flow perturbating member having a first operative position in which a first end protrudes from the respective opening inside the main conduit, a second operative position in which its opposite end protrudes from the respective opening inside the main conduit, and a third operative position, intermediate between the previous ones, in which neither of the two ends protrudes from the respective openings. In correspondence with the aforesaid three operative positions, one obtains the deviation of the flow coming from the main conduit respectively into a first, into a second or into a third outlet conduits communicating with the outlets at the floor, with the outlets at the front side of the dashboard, and with the outlets at the base of the windshield of the motor vehicle.

Also in the case of the aforesaid preferred embodiment, the aforesaid throttling means are constituted by a shutter, mechanically connected to the aforesaid flow perturbating rocker arm member. For example, the shutter can be a part of a single structure incorporating the aforesaid rocker arm member. In the case of the ideal solution which obtains three different temperature levels at the three different outlet conduits of the distributor device, the structure constituting the rocker arm member and the shutter of the by-pass conduit is constructed in such a way that in the intermediate operative position of the rocker arm member (the one in which the two ends of the rocker arm do not protrude from the respective openings) the air flow in the main conduit is deviated in the direction of the outlet conduit communicating with the outlets at the floor. At the same time, the shutter partially obstructs the by-pass conduit thereby generating a temperature of the out-flow of air of an intermediate level, obtained by mixing the main flow which traverses the radiating mass with a small flow of cold air which traverses the by-pass conduit.

When the rocker arm member is in its first end position, in which one of its ends protrudes inside the main conduit of the respective opening, the air flow of the main conduit is deviated towards the outlet conduit communicating with the outlets situated on the front side of the dashboard. In this case, the shutter leaves the by-pass conduit completely unobstructed, thereby providing a lower temperature of the air flowing out of the aforesaid front outlets, as a result of the mixing of the air which traverses the radiating mass with a flow of air which travels through the by-pass conduit, which in this condition is left completely unobstructed.

Lastly, when the rocker arm member is in its other end position, in which its other end protrudes from the respective opening inside the main conduit, the flow of air in the main conduit is deviated towards the outlet conduit communicating with the outlets at the base of the windshield of the motor vehicle. In this case the shutter completely obstructs the by-pass conduit, thereby determining an exit of air at the maximum temperature.

Naturally, as indicated above, this description holds true for any determined setting condition of the temperature regulating system of the air heating and conditioning system.

BRIEF DESCRIPTION OF THE DRAWINGS

Further features and advantages of the invention shall become more readily apparent from the description that follows with reference to the accompanying drawings, provided purely by way of non limiting example, in which.

DETAILED DESCRIPTION OF THE INVENTION

Figure 1:
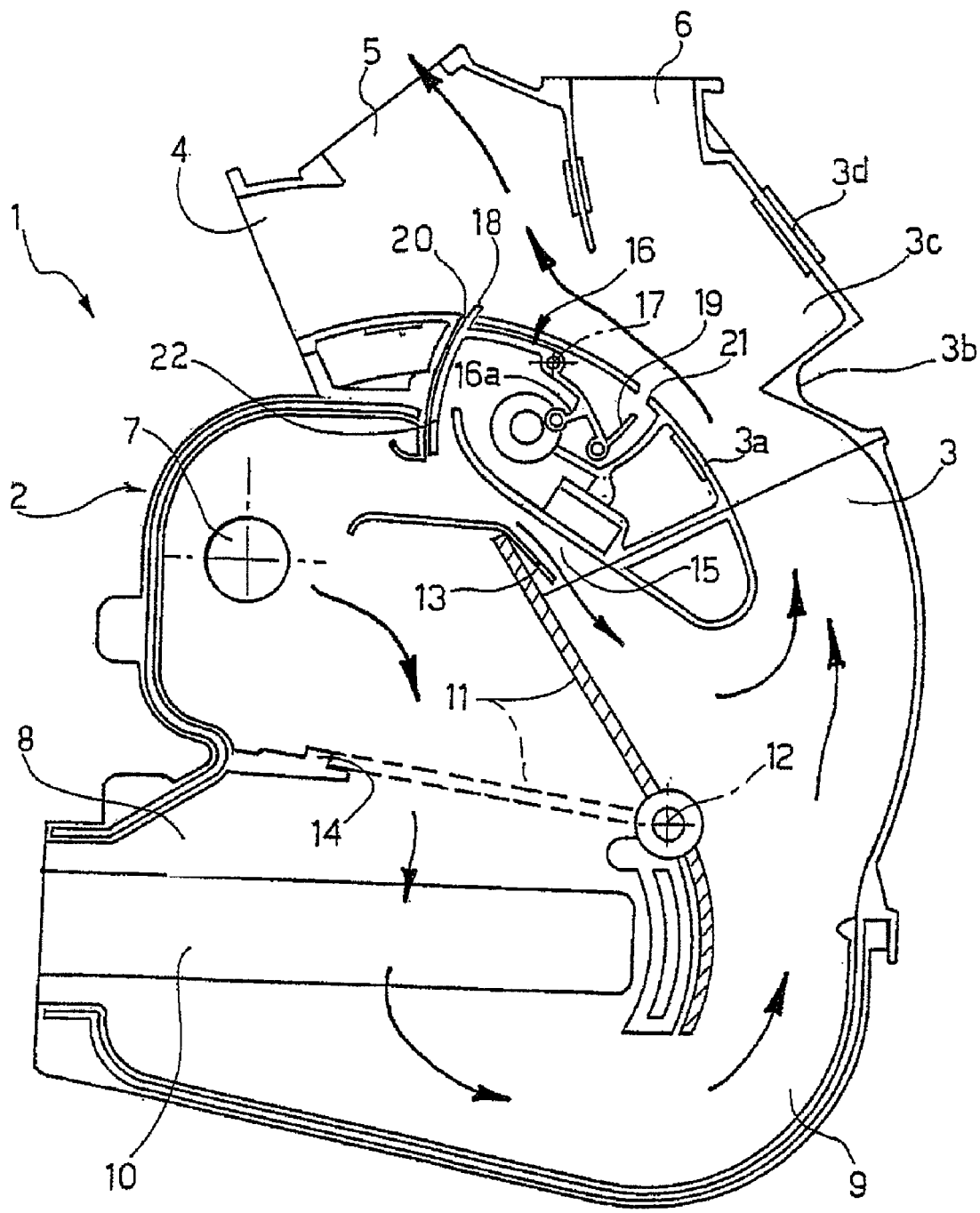
FIGS. 1-3 show a diagrammatic sectional view of an air distributor and mixer device according to the invention in three different operative conditions.
Figure 2:
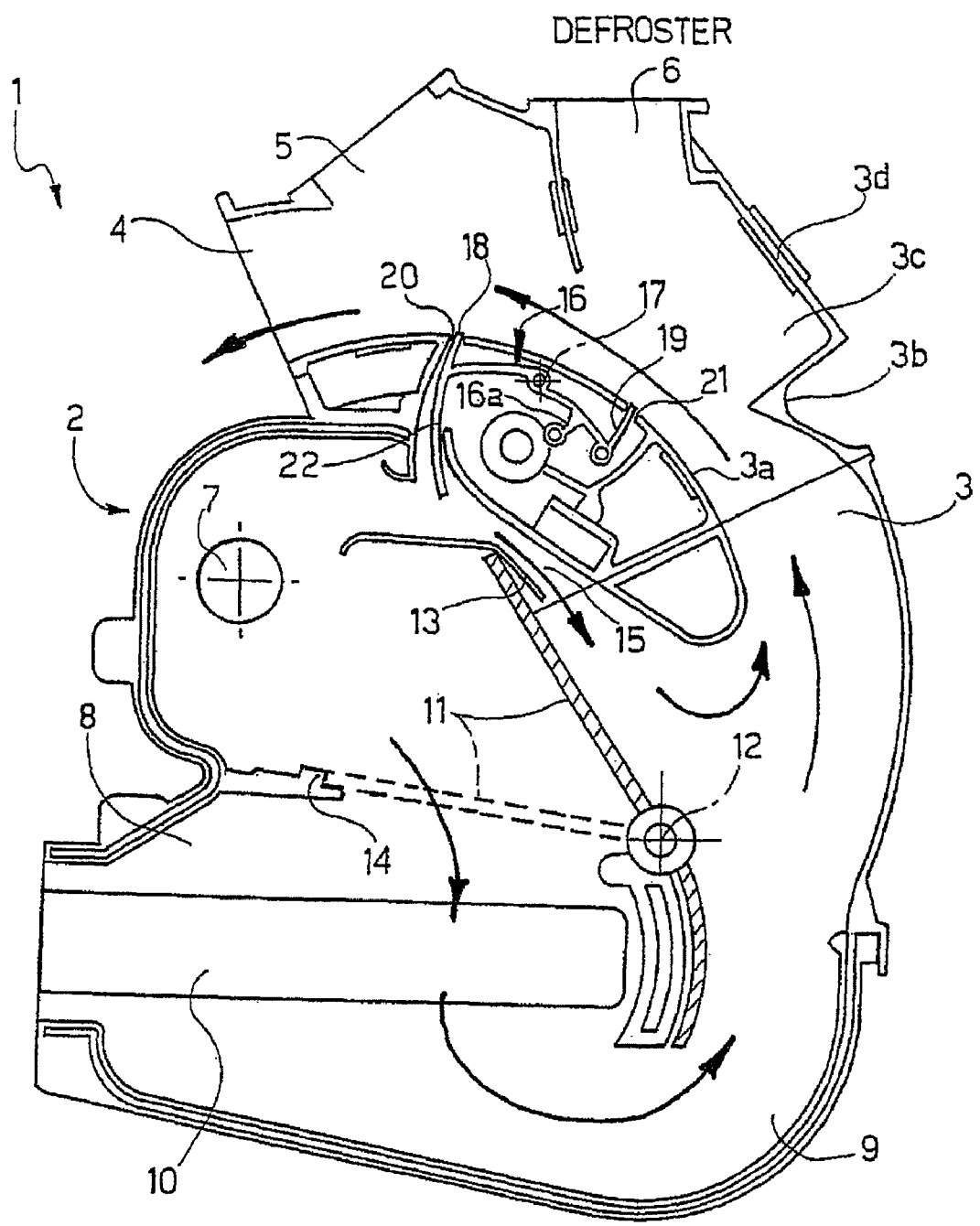
Figure 3:
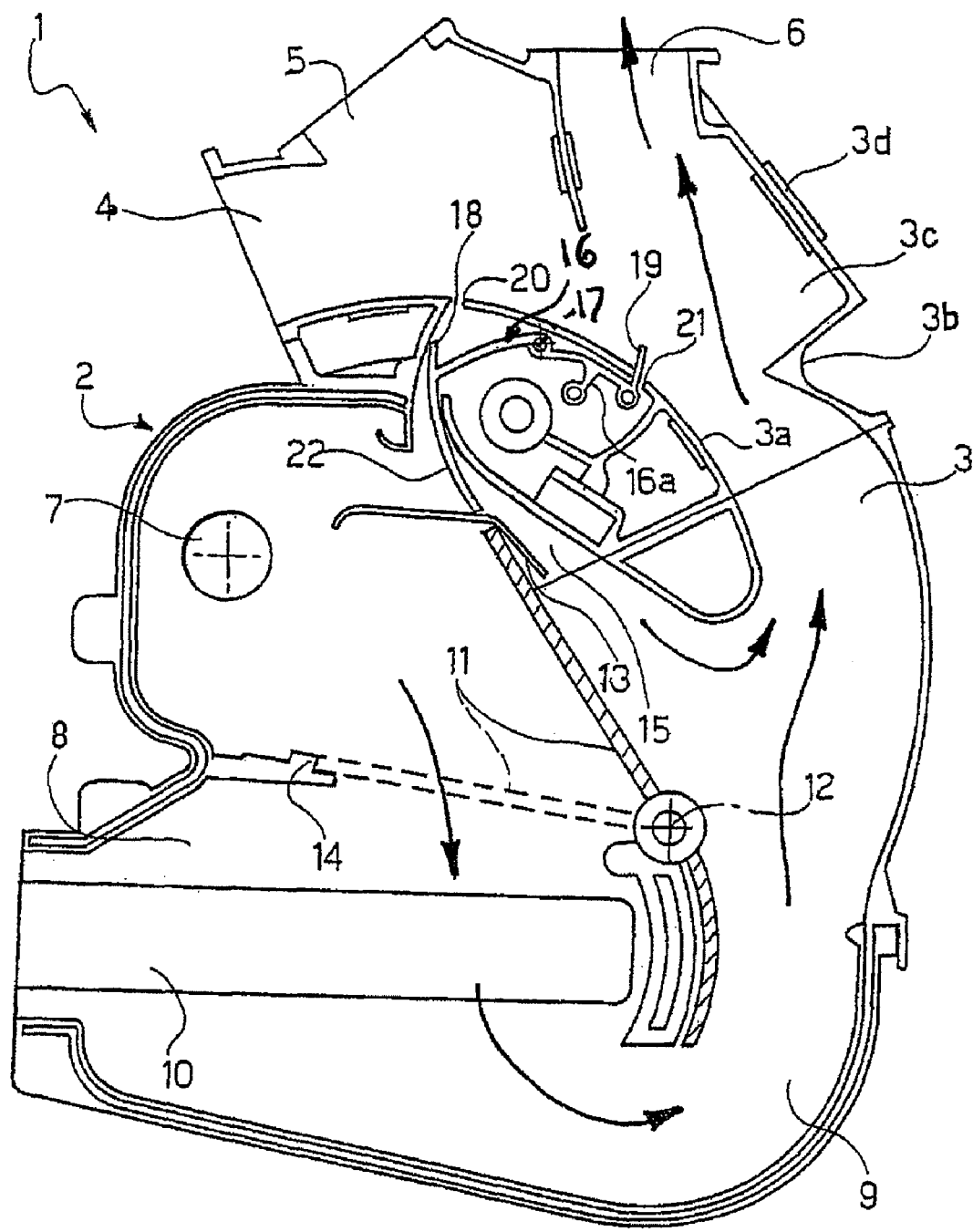

With reference to FIGS. 1-3, the number 1 generally designates an air distributor and mixer device comprising a structure 2, which for instance is constituted by elements made of plastic material connected to each other in any known fashion and defining a main conduit 3 and three outlet conduits 4, 5, 6 communicating with the main conduit 3 and to be connected by means of conduits (not shown) to respective outlets (not shown) for the outflow of air into the passenger compartment of the motor vehicle. The outlet conduit 4 is connected to the outlets that convey the air towards the floor of the motor vehicle passenger compartment, whilst the outlet conduit 5 is connected to the outlets situated on the front side of the dashboard of the motor vehicle and the outlet conduit 6 is connected to the outlets situated at the base of the windshield of the motor vehicle. The main conduit 3 receives the air that enters into the air distributor device through an incoming conduit 7 directed orthogonally to the plane of FIG. 1. The air that enters through the conduit 7 into the distributor device 1 reaches the main conduit 3 passing through a chamber 8 and a communication conduit 9. In the chamber 8 is positioned a radiating mass 10 constituted by an air heating radiator, which is traversed for this purpose by heating fluid, coming from the cooling circuit of the internal combustion engine of the vehicle.

It should be considered that the invention is applicable, in principle, to a device simply having the structure shown in FIGS. 1-3, with a single main conduit 3 which branches off into three outlet conduits 4, 5, 6. In practice, however, normally there are multiple main conduits 3, set side by side, each of which branches off into three outlet conduits and to each of which is associated the distribution and mixing system to be described hereafter. As already mentioned, a typical solution is the one comprising four main conduits, two for the driver side and two for the passenger side, with the two main conduits of each pair serving the purpose respectively of feeding air to the outlets situated towards the centre of the dashboard of the motor vehicle and of feeding air to the outlets situated adjacent to the respective side of the motor vehicle. In this regard, FIG. 5, which shall be described in further detail hereinafter, shows a perspective view of an example of one half of a distributor assembly comprising the two main conduits provided on the driver side with two respective sets of three outlet conduits.

Returning to the simplified theoretical case shown in FIGS. 1-3, the distributor device comprises a system for regulating the air temperature, which may be of any known kind. In the illustrated case, a temperature regulating system is provided with exploits a mixing controlling shutter 11 pivotally mounted around an axis 12 in the structure of the device 2, in order to throttle an opening 13 which places the inlet of the device in direct communication with the main conduit 3, by-passing the radiating mass 10. The mixing controlling shutter 11 can be moved between a first operative position (shown with undotted line in the drawings), in which it completely obstructs the by-pass opening 13, and a second operative position (shown with dotted lines), in which it leaves the opening 13 completely unobstructed, while completely obstructing an opening 14 which places the inlet of the device in communication with the chamber 8, in which the radiating mass is located. In the first position described above, all the air flowing into the device reaches the main conduit 3 after traversing the radiating mass 10, so that the temperature of the air in the main conduit 3 reaches its maximum value, whilst in the second operative position described above, all the cold air entering the device passes in the main conduit 3 through the opening 13 without traversing the radiating mass 10, so that the air temperature in the main conduit 3 is at its minimum level. Naturally, if the air conditioning system also comprises an air cooling system, upstream of the inlet 7 there will be an evaporator device capable of refrigerating the air flowing towards the device 2.

As indicated, at any rate the air temperature regulating system can be of any kind. For example, another known system can also be adopted, which does not include the by-pass opening 13 and the related mixing controlling shutter 11, but only a system for regulating the temperature of the heating water that flows through the radiating mass 10. As indicated, the invention is applicable whatever is the kind of the air temperature regulating system.

With reference to the solution illustrated in the accompanying drawings, the system comprises a second by-pass conduit 15 which places the inlet 7 of the device in direct communication with the main conduit 3, in parallel with respect to the opening 13 and also in parallel with respect to the path through the radiating mass 10.

The air distributor device of the invention comprises Coanda effect distributor means which are capable of deviating the flow that traverses the main conduit 3 into one of the three outlet conduits 4, 5 or 6 by means of the Coanda effect. In the case of the illustrated example, said distributor means are constituted by a single flow perturbating member 16 of the kind disclosed in the prior Italian patent application No. TO2002A000617 of 16 Jul. 2002 by the same Applicant, still secret as of the priority date of the present application. The flow perturbating member 16 is a rocker arm member pivotally mounted on the structure 2 of the distributor device about an axis 17 and having two operative ends 18,19 situated in correspondence with two openings 20,21 obtained in a lateral wall 3a of the main conduit 3.

The Coanda effect has long been known and studied, and it has been exploited in several applications, for the purpose of obtaining the deviation of a flow of air without making use of mechanical deviating elements which always entail the drawback of interfering with the characteristics of the main flow of air when it is deviated. The Coanda effect causes a flow of air coming from an outlet and flowing into a widened chamber to adhere to the wall of said chamber which is closest to the outlet.

For instance, in the case of the solution illustrated in FIGS. 1-3, the main conduit 3 has a narrowed section 3b which ends in a widened chamber 3c having the aforementioned lateral wall 3a positioned immediately next to the outflow section 3b, and an opposite wall 3d more spaced therefrom. By effect of said geometry, when the flow perturbating member 16 is in an intermediate position in which both ends 18,19 are retracted in the respective openings 20,21 and do not protrude inside the main conduit 3, the flow of air coming from the main conduit 3 remains adherent to the lateral wall 3a, so that it is entirely deviated into the outlet conduit 4. The aforesaid condition is illustrated in FIG. 2. When the flow perturbating member 16 is rotated counter-clockwise (with reference to the drawings) from the intermediate condition shown in FIG. 2, in such a way as to be in the position shown in FIG. 3, the end 19 acts as a flow perturbating member causing the detachment of the air flow from the wall 3a. In this condition, again due to the Coanda effect, the air flow is attracted by the nearest lateral wall, which in this case is the wall 3d, so that the flow is deviated in the outlet conduit 6. Lastly, when the flow perturbating member 16 is in its other end position, shown in FIG. 1, the end 18 also causes the detachment of the flow of air from the wall 3a, but in a position situated downstream of the intake of the conduit 6, so that the air flow is directed towards the outlet conduit 5.

The accompanying drawings do not show the means used to actuate the oscillation of the flow perturbating rocker arm member 16 about the axis 17. Said means can be constructed in any known fashion. In the illustrated case, the flow perturbating member 16 comprises an arm 16a with an actuating end to be connected to a mechanical actuating transmission (not shown herein) for example a cam transmission. In any case, it is readily apparent to those versed in the art that a variety of different actuator devices, with related mechanical transmissions, can be applied to actuate the rocker arm member 16.

According to the invention, the rocker arm member 16 is part of a structure that also incorporates a shutter 22 for throttling the by-pass conduit 15. By effect of this arrangement, the degree of throttling of the by-pass conduit 15 is different according to the operative position of the rocker arm member 16. In particular, in the condition of FIG. 1 (deviation towards the outlet conduit 5 communicating with the outlets located on the front side of the dashboard), the shutter 22 leaves the by-pass conduit 15 fully opened, so that, once the air temperature regulating system is set (the drawing shows, for example, the mixing controlling shutter 11 in the position corresponding to the maximum temperature) the flow coming from the radiating mass 10 in the main conduit 3 is mixed with a flow of cold air which traverses the entire section of the by-pass conduit 15, so that the temperature obtained is at the lowest level achievable for a same position of the shutter 11. In the condition of FIG. 2 (deviation to the outlet conduit 4 communicating with the outlets near the floor), the throttling of the by-pass conduit is intermediate, so that the temperature reaches an intermediate value, whereas in the case of FIG. 3 (deviation towards the outlets adjacent to the windshield) the shutter 22 completely obstructs the by-pass conduit 15, so that the temperature of the out-flowing air reaches its maximum level.

As already indicated, a practical embodiment may comprise a plurality of devices of the type schematically illustrated in FIGS. 1-3 set side by side in such a way that one of them can be used to convey very warm air towards the windshield whilst the other one can be used to send less warm air to the feet or still less warm air on the front outlets of the dashboard, without requiring a different temperature regulation setting. Naturally, in the aforementioned case of multiple systems of conduits set side by side, the means for actuating the various flow perturbating members 16 and the related shutters 22 are comprised in a common actuation device, as already illustrated in the Applicant's aforementioned prior patent application WO02072371.

If only two temperature levels are required, instead of three different levels, it will be sufficient to shape the shutter 22 in such a way that it produces a total obstruction of the by-pass conduit 15 already in the condition of FIG. 2, in which case it will naturally be necessary to allow, in the condition shown in FIG. 3, the shutter 22 to move in a further advanced position, without interfering with the walls of the conduit 15.

As has been indicated, in order to simultaneously provide two different distribution configurations, the air heating and cooling assembly in its entirety shall be constituted by a minimum of two distributors for conditioning systems of the so-called "mono-zone" type or by a minimum of four distributors for conditioning systems of the so-called "bi-zone" type: in this case each distributor shall be associated to a by-pass conduit and to a mixing chamber whilst there shall be one mixing controlling shutter 11 in the "mono-zone" system and two shutters in the "bi-zone" system.

Figure 4:
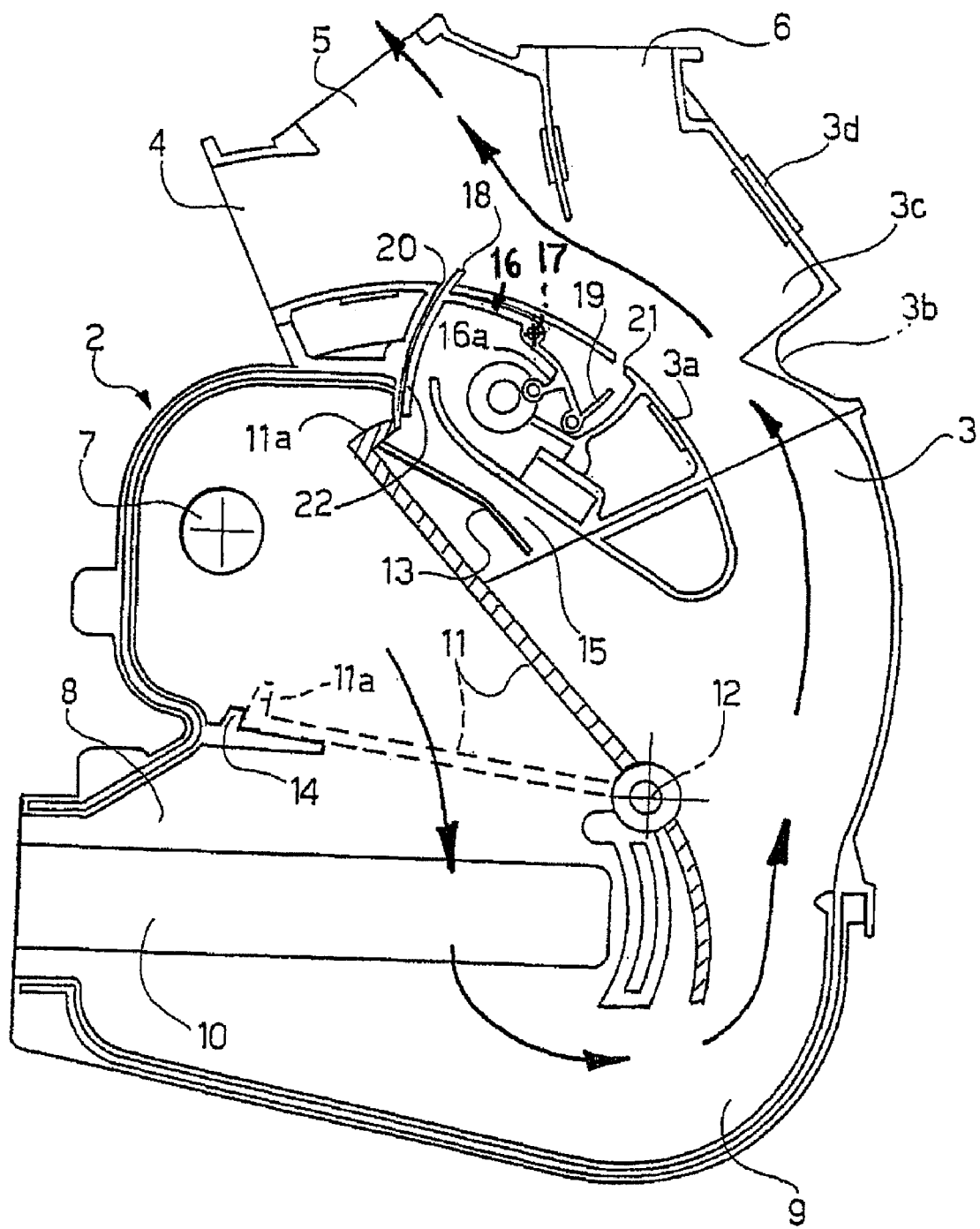
FIG. 4 shows a variant of the solution shown in FIGS. 1-3.

FIG. 4 shows a variant in which the different temperature levels are obtained only provided the mixing controlling shutter 11 is not in the condition of maximum temperature. In this condition, the shutter has an appendage 11a which obstructs the by-pass conduit 15 to assure that when the temperature regulating system is set to the maximum temperature, maximum heating is always accomplished, regardless of the selected distribution configuration.

As has also been indicated previously, the solution described above also applies if the air temperature regulation system exploits only the regulation of the temperature of the heating liquid in the radiator 10. In this case there is no mixing controlling shutter 11 nor an associated by-pass opening 13. The by-pass conduit 15 allows to bleed off a quantity of cold air and to inject it directly downstream of the radiating mass.

According to another possible configuration, each Coanda effect distributor of the type of distributor 2 has a respective mixing controlling shutter 11, independently of the shutters of the distributor devices set side by side thereto. The shutter 11 can be operatively connected (mechanically or electrically) to the flow perturbating rocker arm member 16 in such a way as to determine different outflow temperatures of the air according to the distribution configuration selected for each distributor. In the case of this solution, the by-pass conduit 15 is therefore no longer necessary, nor is there any related shutter system 22. In other words, in this variation the opening 13 is used as a by-pass conduit and the shutter 11 as a means for throttling the by-pass conduit.

Figure 5:
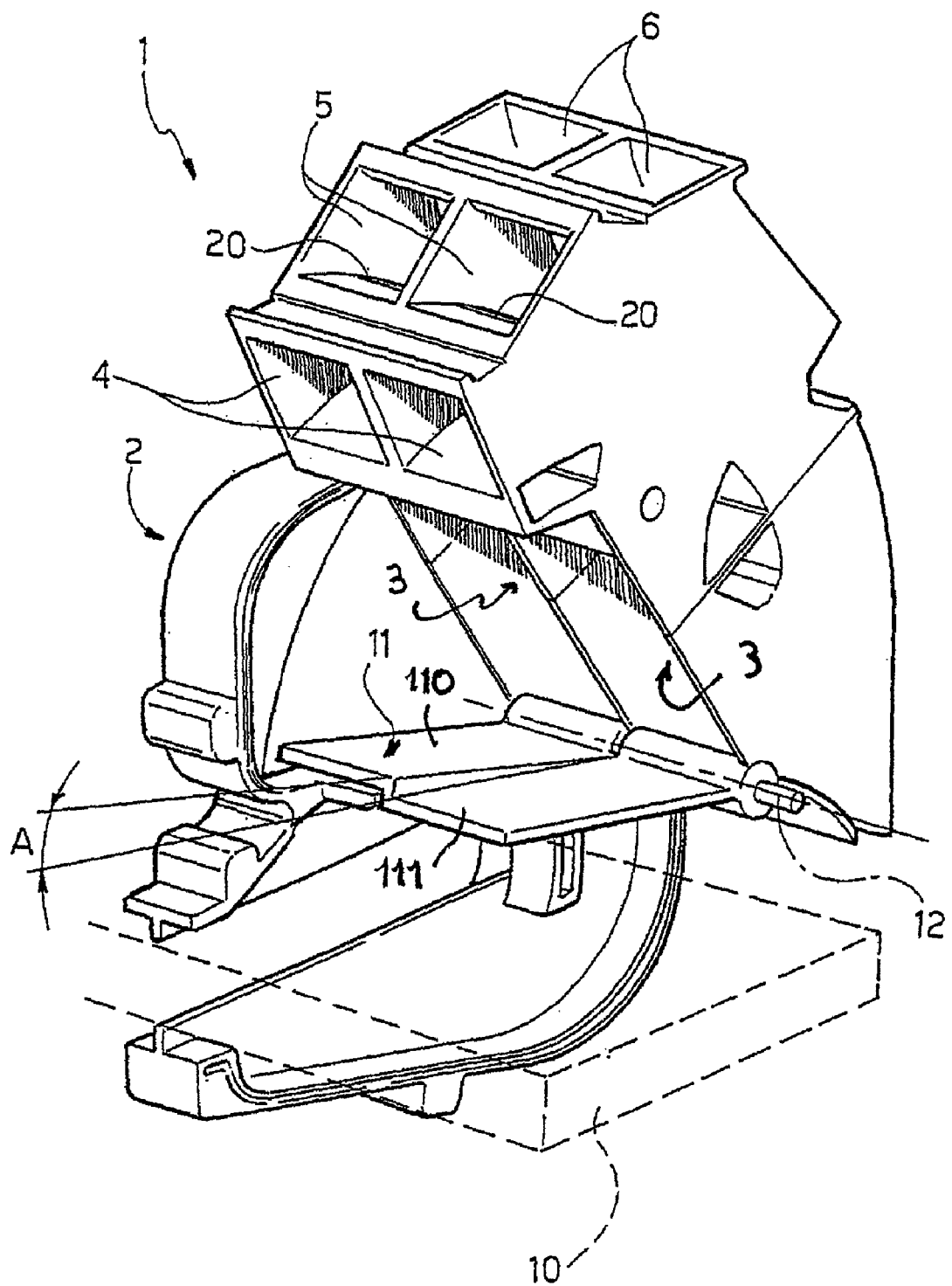
FIG. 5 is a partial perspective and partially sectioned view of a distributor assembly according to the invention.

As has been indicated previously, FIG. 5 shows one half of a distributor assembly of the bi-zone type comprising two main conduits for the driver side and two main conduits for the passenger side. The part shown in the figure is the one corresponding to the driver side, with a set of three outlet conduits to serve the outlets positioned on the left side of the dashboard of the motor vehicle, and a set of three outlet conduits to serve the outlets situated at the centre of the dashboard of the motor vehicle.

Obviously, an identical and symmetrical structure is provided for the other half of the group which serves the passenger side. In the whole assembly thus described, the two central distributors allow to select, respectively for the driver side and for the passenger side, the "floor", "windshield" and "central" outlets, whilst the lateral distributors allow to select the same outlets for the left side and for the right side of the dashboard. In this case, there are two mixing controlling shutters, one for the driver side and the other one for the passenger side. According to an additional preferred feature, each shutter has a discontinuity in the passage from the central distributor to the lateral one, so that, in the intermediate positions, it favours the passage of cold air towards the central distributor. Substantially, it is as if each shutter 11 were constituted by two shutters, each facing the respective distributor, angularly offset by an angle A (FIG. 5), but rigidly connected. Also the end stop abutments corresponding to the "max cold" and "max heat" positions are angularly offset to assure the limit thermal performance for each distribution configuration. Since, in intermediate mixing configurations, more cool air will always reach the central distributor than the lateral distributor, the so-called "bi-level" function, i.e. with two different temperature levels depending on the selected outlet, is obtained by sending cooler air to the central outlets and warmer air to the floor. Similarly, if the central distributor sends the air to the floor and the lateral distributor to the windshield, two temperature levels are obtained for this configuration as well (in particular the air flowing out at the windshield will be warmer than the air flowing out at the floor). In theory therefore, the solution with discontinuous shutter illustrated in FIG. 5 could even be used independently from the use of the above described system with a by-pass conduit 15 and a shutter 22 associated to the flow perturbating rocker arm member 16.

Naturally, without altering the principle of the invention, the construction details and the embodiments may by widely varied from what is described and illustrated herein, without thereby departing from the scope of the present invention.

What is claimed is:

1. An air conditioning system for a motor vehicle, comprising:
    an air distributor device (1) including:
        a structure (2) defining a main conduit (3) and a plurality of outlet conduits (4,5,6) communicating with the main conduit (3) and to be connected to a plurality of outlets for the outflow of air into the motor vehicle passenger compartment, Coanda effect distributor means mounted in the structure (2) of the distributor device (1) and movable to a plurality of operative positions each causing deviation, by the Coanda effect, of the air flowing through the main conduit into a selected one of said outlet conduits, said Coanda effect distributor means comprising a flow perturbating member (16) having at least one active portion (18) and movable between:

a first operative position, in which said active portion (18) is retracted within an opening (20) formed in a lateral wall (3a) of the main conduit (3), so that the air flowing through the main conduit (3) remains adherent to said lateral wall (3a) by the Coanda effect, thus flowing into a first outlet conduit (4) having a lateral wall arranged as an extension of said lateral wall (3a) of the main conduit, and a second operative position in which said active portion (18) protrudes inside the main conduit (3) through said opening (20) formed in said lateral wall (3a) of the main conduit (3), so that the air flow is caused to detach from said lateral wall (3a) and to be attracted, again by the Coanda effect, by an opposite wall of a second outlet conduit (5), thus flowing into said second outlet conduit (5), a heat radiating mass (10) positioned upstream of the main conduit (3) in a conduit portion connecting the main conduit (3) to an inlet conduit (7), in such a way that said radiating mass (10) is traversed by the flow of air which arrives into the main conduit (3) from the inlet conduit (7) of the distributor device (1), to heat said flow of air, means for changing the temperature of the flow of air conveyed into said main conduit, said temperature changing means comprising a by-pass conduit (15) which connects the inlet conduit (7) to the main conduit (3) in parallel to said conduit portion in which said radiating mass (10) is positioned, and a shutter (22) for throttling said by-pass conduit (15), for variably obstructing said by-pass conduit (15), said shutter (22) being operatively connected to said flow perturbating member (16) of the Coanda effect distributor means, so that different positions of the perturbating member (16), which cause deviation of the air flow into a selected one of said outlet conduits (4,5,6), correspond to different positions of the shutter (22), in such a way that the temperature of the flow of air exiting the distributor device (1) has different values depending on which outlet conduit (4,5,6) has been selected through said perturbating member of the Coanda effect distributor means.

2. An air conditioning system as claimed in claim 1, wherein said flow perturbating member (16) is a rocker arm member having two opposite active ends (18,19) situated in correspondence with two openings (20, 21) formed in said lateral wall (3a) of the main conduit (3) and in that said rocker arm member (16) has a first end operative position, in which one of its opposite ends (18, 19) protrudes through the respective opening (20, 21) inside the main conduit (3), a second operative position in which the other operative end of the rocker arm member (16) projects through the respective opening (20, 21) inside the main conduit (3) and a third operative position, intermediate between the two previous ones, in which neither of the two operative ends (18, 19) protrudes inside the main conduit (3), and in that said shutter is defined by the same structure constituting the aforesaid rocker arm member (16).

3. An air conditioning system as claimed in claim 2, said first end operative position of the rocker arm member (16), the shutter (22) leaves the aforesaid by-pass conduit (15) completely unobstructed and in the aforesaid second end operative position of the rocker arm member (16), the shutter (22) completely obstructs the by-pass conduit (15).

4. An air conditioning system as claimed in claim 3, wherein said third intermediate operative position of the rocker arm member (16), the shutter (22) partially obstructs the by-pass conduit (15).

5. An air conditioning system as claimed in claim 3, wherein said third intermediate operative position of the rocker arm member (16) the shutter (22) completely obstructs the by-pass conduit (15).

6. An air conditioning system as claimed in claim 1, wherein said distributor device further comprises a mixing controlling shutter (11) which controls an opening (13) which places the inlet conduit (7) in communication directly with the main conduit (3), in parallel with respect to the conduit portion in which the radiating mass (10) is positioned.

7. An air conditioning system as claimed in claim 1, characterised in that it comprises an air distributor and mixer assembly comprising a plurality of main conduits set mutually side by side and each communicating with a plurality of outlet conduits, each main conduit being provided with respective Coanda effect distributor means, with a respective by-pass conduit and with the respective shutter (22).

8. An air conditioning system as claimed in claim 1, characterised in that it comprises three outlet conduits (4, 5, 6) respectively to be connected to outlets which direct the air adjacent to the floor of the motor vehicle passenger compartment, to outlets situated in the front part of the dashboard of the motor vehicle oriented towards the occupants of the motor vehicle, and to outlets situated at the base of the windshield of the motor vehicle, and in that the aforesaid throttling means are shaped and positioned in such a way as to generate in the main conduit (3) a flow having a first, relatively lower, temperature, when the Coanda effect distributor means deviate the flow of air into the outlet conduit (5) communicating with the front outlets, a flow of air at a second, relatively higher temperature when the Coanda effect distributor means send the flow of air from the main conduit (3) to the outlet conduit (4) connected to the outlets adjacent to the floor of the motor vehicle passenger compartment, and a flow of air having a third, still higher temperature, when the Coanda effect distributor means deviate the flow of air from the main conduit (3) to the third outlet conduit (6) communicating with the outlets situated at the base of the windshield of the motor vehicle.

9. An air conditioning system as claimed in claim 1, characterised in that it is provided with means for regulating the heating or cooling air including a mixing controlling shutter (11) which controls an opening (13) that places the inlet conduit (7) of the distributor device directly in communication with the main conduit (3) in parallel to the portion of conduit in which the radiating mass (10) is positioned, characterised in that said mixing controlling shutter (11) is operatively connected to said flow perturbation member of the Coanda effect distributor means, in such a way that to different operative positions of the Coanda effect distributors also correspond different operative positions of the mixing controlling shutter (11).

10. An air conditioning system as claimed in claim 2, characterised in that said mixing controlling shutter (11) is provided with an appendage (11a) which completely obstructs the by-pass conduit (15) when the mixing controlling shutter is in the position of complete obstruction of the aforesaid by-pass opening (13).

11. An air conditioning system as claimed in claim 1, comprising at least two main conduits (3) set mutually side by side, communicating with respective sets of outlet conduits (4, 5, 6) which in turn are connected to a series of outlets situated in the central part of the dashboard of the motor vehicle and to a series of outlets situated on a side of the dashboard of the motor vehicle, characterised in that to the two aforesaid main conduits is associated a single mixing controlling shutter (11) comprising two portions (110, 111) angularly offset from each other and positioned in a single chamber for feeding air to the two main conduits, in such a way as to favour a greater flow of cold air towards the main conduit communicating with the central outlets than towards the main conduit communicating with the lateral outlets.

12. An air conditioning system for a motor vehicle, comprising:

an air distributor device (1) including:

a structure (2) defining a main conduit (3) and a plurality of outlet conduits (4, 5, 6) communicating with the main conduit (3) and to be connected to a plurality of outlets for the outflow of air into the motor vehicle passenger compartment, Coanda effect distributor means mounted in the structure (2) of the distributor device (1) and movable to a plurality of operative positions each causing deviation, by the Coanda effect, of the air flowing through the main conduit into a selected one of said outlet conduits, wherein said distributor device (1) further comprises:

a radiating mass (10) positioned upstream of the main conduit (3) in such a way as to be traversed by the flow of air which arrives into the main conduit (3) from an inlet conduit (7) of the distributor device (1), to heat said flow of air, means which determine a variation of the temperature of the flow of air conveyed in said main conduit, said means being controlled by said Coanda effect distributor means, in such a way that the temperature of the air flowing out of the distributor device is a function of the operative position of said Coanda effect distributor means, wherein said distributor device (1) further comprises a by-pass conduit (15) which connects the inlet conduit (7) to the main conduit (3) in parallel to the portion of conduit where the aforesaid radiating mass (10) is positioned, and a shutter (22) for throttling said by-pass conduit (15) for variably obstructing said by-pass conduit (15) depending upon the various operative positions of the Coanda effect distributor means which determine the deviation of the flow of the main conduit (3) into one of the aforesaid outlet conduits (4, 5, 6), in such a way that the temperature of the flow of air exiting the distributor device (1) has different values depending on which outlet conduit (4, 5, 6) has been selected through said Coanda effect distributor means, wherein said Coanda effect distributor means comprise at least a flow perturbating member (16) having at least two different operative positions to cause the deviation, by Coanda effect, of the flow of air that travels through the main conduit (3) at least into a first or into a second outlet conduit (4, 5, 6), and said shutter (22) is mechanically connected to said flow perturbating member (16), and wherein said flow perturbating member (16) is a rocker arm member having opposite operative ends (18, 19) situated in correspondence with two openings (20, 21) formed in a lateral wall (3a) of the main conduit (3) and in that said rocker arm member (16) has a first end operative position, in which one of its opposite ends (18, 19) protrudes through the respective opening (20, 21) inside the main conduit (3), a second operative position in which the other operative end of the rocker arm member (16) projects through the respective opening (20, 21) inside the main conduit (3) and a third operative position, intermediate between the two previous ones, in which neither of the two operative ends (18, 19) protrudes inside the main conduit (3), and in that said shutter (22) is defined by the same structure constituting the aforesaid rocker arm member (16).

* * * * *